Feb. 18, 1936.    G. MILLS    2,031,174
GAS PRESSURE REGULATOR
Filed Dec. 20, 1934
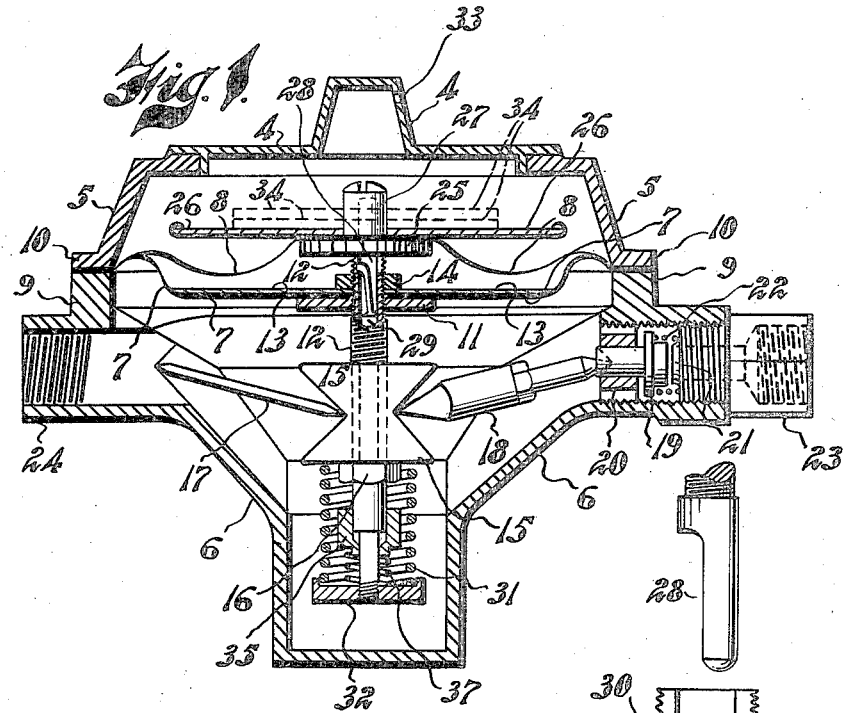
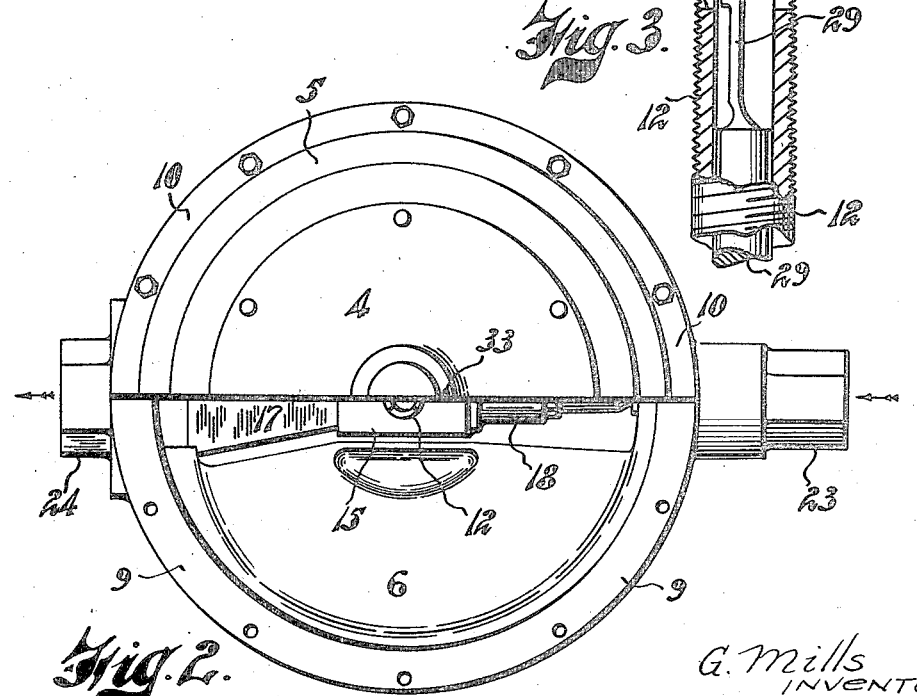
G. Mills, INVENTOR Patented Feb. 18, 1936

2,031,174

UNITED STATES PATENT OFFICE 2,031,174

GAS PRESSURE REGULATOR

George Mills, Gordon, near Sydney, New South Wales, Australia

Application December 20, 1934, Serial No. 758,485
In Australia January 4, 1934

5 Claims. (Cl. 50—5)

This invention relates to improvements in gas pressure regulators and has particular reference to diaphragm operated gas pressure regulators.

An object of the present invention is to devise an apparatus of the above nature which will accurately regulate the gas pressure as required and also shut off automatically the supply of gas and maintain it in such a condition whenever the working diaphragm fails to function correctly through wear or damage.

A further object of the present invention is to produce a device of the above nature which is economical to construct, very effective in use, sensitive and reliable in operation and which will preclude the possibility of waste of gas or increase of pressure above the regulated and constant pressure required on the consumer's side of the regulator in the event of the working diaphragm leaking.

The invention comprises a body portion which may be divided into two or more parts having flanges adapted to be bolted or otherwise coupled together in gas tight manner, a working diaphragm and an emergency diaphragm disposed for functioning in said body portion, means for operatively connecting the working diaphragm to a toggle centre member, toggle levers and a gas supply control valve; said valve being capable of being shut when the working diaphragm and toggle centre member are raised, said valve being opened when the working diaphragm and toggle centre member are lowered.

The control valve and its operating mechanism are such that the inflow of pressure gas through the inlet port of the valve is subjected to the action of a weighted diaphragm which on rising under the action of the pressure gas closes the control valve upon its seat and on falling, opens the said valve again thereby maintaining a predetermined reduction in the pressure of the gas supplied through the outlet pipe of the regulator.

The body of the regulator may be arranged with the inlet and outlet horizontally and may also be adapted to allow for inlet and outlet vertically.

In the event of the working diaphragm leaking the control valve is adapted to be automatically closed against the inlet port preventing the escape of gas to the atmosphere. In such circumstances the pressure on the outlet or consumer's side of the regulator does not increase thus avoiding damage to the meters connected therewith.

The mechanism of the regulator is adapted to operate with the two diaphragms the one a working diaphragm and the other a following or idling diaphragm adapted to function as an emergency diaphragm to close the control valve should a leak occur in the working diaphragm.

The emergency diaphragm may be fastened between the same flanges as the working diaphragm or otherwise as desired. The body is provided with a cover having an air opening to permit the diaphragms to operate under atmospheric conditions.

But in order that the invention may be more clearly understood, reference will now be made to the accompanying drawing, wherein:—

Figure 1 is a sectional elevation of the device showing the operating parts.

Figure 2 is a plan view thereof with parts cut away to show the toggle valve operating mechanism.

Figure 3 is a sectional elevation of the catch spindle and associated parts.

The body of the regulator is divided into three portions, 4, 5, and 6 adapted to be connected to form a housing for the working diaphragm 7, the emergency diaphragm 8 and the control valve operating mechanism.

The diaphragms 7 and 8 are preferably clamped between the flanges 9 and 10 of the lower body portion 6 and the central body portion 5 respectively.

The control valve operating mechanism consists of a disc 11 screwed to a tube 12 on the top of which the diaphragm 7 and the diaphragm plate 13 are fastened by a lock nut 14. The tube 12 is secured to a toggle centre member 15 by a nut 16. Toggle levers 17 and 18 are actuated by rising and falling movement of the toggle centre piece member 15 and impart the necessary movement for closing and opening a control valve 19 which is guided by a value guide piece 20. When the toggle levers 17, 18 are lowered the control valve 19 is forced from its seat 21 by a spring 22.

The body portion 6 has an inlet connection 23 and an outlet connection 24.

The amount of opening to the control valve 19 can be adjusted as required by lengthening or shortening the toggle lever 18. The mechanism provided to automatically shut off the supply of gas when the working diaphragm 7 leaks, will now be described.

The emergency diaphragm 8 which is suitably fastened above working diaphragm 7 is fastened at its centre between a disc piece 25 and a diaphragm plate 26 by a nut 27 and a trip piece 28.

When the working diaphragm 7 leaks, the pressure increases under and elevates the emergency diaphragm 8 together with the diaphragm plate 26, withdrawing the trip piece 28 and allowing a catch spindle to be freed from the holding catch or projection 30 and thus release compression spring 31. The spring 31 then forces a seating piece 32, to which the catch spindle 29 is fastened, to the bottom recess of casing 6 and also forces toggle centre member 15 upwards and forces the control valve 19 against its seat 21 and shuts off the gas supply.

The space under cover 4 and above the emergency diaphragm 8 is open to the atmosphere through an opening 33.

By removing the cover 4 the necessary weights 34 for giving the required outlet pressure can be placed on the diaphragm plate 26.

The space between the diaphragms 7 and 8 is what might be termed "dead space" and to preclude any possibility of pressure gas getting through tube 12 and into this space, a stuffing box 35 is provided to make a gas tight joint between the catch spindle 29 and the bottom face of tube 12; this stuffing box 35 is kept tightly in position by a spring 37.

The device, having first been adjusted and weighted to give the desired reduction in pressure, will work automatically opening and closing the control valve and maintaining the required pressure at the outlet 24.

Should the working diaphragm 7 fail the emergency diaphragm 8 automatically lifts the trip piece 28, releasing the catch spindle 29, causing the compression spring 31 to force the toggle centre member 15 upwardly and suddenly shut off the gas supply at the control valve seat 21 and thereby prevent loss or escape of gas, and also prevent increase of pressure in gas meter and the consumer's appliances.

I claim:

1. Improvements in gas pressure regulators comprising a control valve operated by a working diaphragm and toggle operating mechanism housed in a body portion, said control valve being also automatically closed on failure of the working diaphragm by an emergency diaphragm concentrically mounted above the working diaphragm.

2. Improvements in gas pressure regulators comprising a control valve operated by a working diaphragm and toggle operating mechanism housed in a body portion, said working diaphragm carrying a tube having a catch spindle therein, an emergency diaphragm concentrically mounted above the working diaphragm and carrying a trip piece for releasing the catch spindle and automatically closing the control valve on failure of the working diaphragm.

3. Improvements in gas pressure regulators comprising a control valve operated by a working diaphragm and toggle operating mechanism housed in a body portion, said working diaphragm carrying a tube having a catch spindle therein, an emergency diaphragm concentrically mounted above the working diaphragm and carrying a trip piece for releasing the catch spindle, a spring held in compression by the catch spindle and its trip piece said spring on being released actuating toggle mechanism to force the control valve into a position to shut off the supply of gas.

4. Improvements in gas pressure regulators comprising a control valve operated by a working diaphragm and toggle operating mechanism housed in a body portion, said working diaphragm carrying a tube having a catch spindle therein, a stuffing box for the tube engaged by a spring and provided to prevent leakage of gas to the space between the working diaphragm and an emergency diaphragm, said emergency diaphragm being concentrically mounted above the working diaphragm and carrying a trip piece for releasing the catch spindle and automatically closing the control valve on failure of the working diaphragm.

5. Improvements in gas pressure regulators as claimed in 4 further characterized in that a toggle center piece is carried by the tube which contains the catch spindle and trip piece for effecting operation of the control valve by the emergency diaphragm.

GEORGE MILLS.